(12) United States Patent
Meilunas et al.

(10) Patent No.: US 6,484,776 B1
(45) Date of Patent: Nov. 26, 2002

(54) SYSTEM FOR CONSTRUCTING A LAMINATE

(75) Inventors: Raymond J. Meilunas, Hampton Bays, NY (US); Gregory P. Dillon, Commack, NY (US); Jerrell A. Nardiello, Hicksville, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/545,563

(22) Filed: Apr. 7, 2000

(51) Int. Cl.$^7$ .................. B30B 15/06; B29C 33/02; B32B 31/20
(52) U.S. Cl. ............. 156/382; 156/510; 156/563; 156/581; 156/583.3; 156/213; 156/267; 156/285; 425/112; 425/175
(58) Field of Search ................ 156/211, 212, 156/213, 267, 382, 570, 563, 581, 583.3, 285; 425/112, 127, 175

(56) References Cited

U.S. PATENT DOCUMENTS

| | | | |
|---|---|---|---|
| 2,968,838 A | 1/1961 | Hicks | 18/34 |
| 3,596,869 A * | 8/1971 | Humphrey | 249/155 |
| 4,200,272 A | 4/1980 | Godding | 269/26 |
| 4,684,113 A | 8/1987 | Douglas et al. | 269/21 |
| 4,731,144 A | 3/1988 | Kommineni et al. | 156/245 |
| 5,151,277 A | 9/1992 | Bernardon et al. | 425/112 |
| 5,330,343 A | 7/1994 | Berteau | 425/175 |
| 5,513,972 A * | 5/1996 | Schroeder et al. | 249/155 |
| 5,546,784 A * | 8/1996 | Haas et al. | 72/413 |
| 5,578,155 A | 11/1996 | Kawaguchi | 156/267 |
| 5,637,175 A | 6/1997 | Feygin et al. | 156/264 |
| 5,730,817 A | 3/1998 | Feygin et al. | 156/64 |
| 5,743,164 A | 4/1998 | Guez | 83/862 |
| 5,779,833 A | 7/1998 | Cawley et al. | 156/89 |
| 5,846,464 A | 12/1998 | Hoffman | 264/219 |
| 5,851,563 A | 12/1998 | Hoffman | 425/175 |
| 6,053,026 A * | 4/2000 | Nardiello et al. | 72/297 |
| 6,089,061 A * | 7/2000 | Haas et al. | 72/14.8 |

FOREIGN PATENT DOCUMENTS

GB   2 268 699 A   1/1994   ......... B29C/141/38

OTHER PUBLICATIONS

PCT International Search Report dated Oct. 22, 2001 re International Application PCT/US 01/10924 filed Mar. 4, 2001 (Applicant's ref. 019937.0204).

* cited by examiner

Primary Examiner—Sam Chuan Yao
(74) Attorney, Agent, or Firm—Baker Botts L.L.P.

(57) ABSTRACT

In one form of the present invention, a system for constructing a laminate (122) is disclosed. The system comprises a ply feeder (101) that sequentially stacks one or more plies (100) to form a ply stack (102). A computer (106) directs a laser (104) to cut each ply (100) to a desired shape after becoming part of the ply stack (102). The ply stack (102) is then placed on a reconfigurable tool (112). An applied pressure compresses the ply stack (102) against the reconfigurable tool (112) while an actuator (124) subsequently reconfigures the reconfigurable tool pins (114) to a predetermined shape. In a more particular embodiment, a composites forming process is used, such as diaphragm forming, to compress the ply stack (102) before the reconfigurable tool pins (114) are reconfigured. In another particular embodiment, the reconfigurable tool pins (114) are first reconfigured then a vacuum diaphragm forming process is utilized to compress the ply stack (102) against the reconfigurable tool (112).

5 Claims, 3 Drawing Sheets

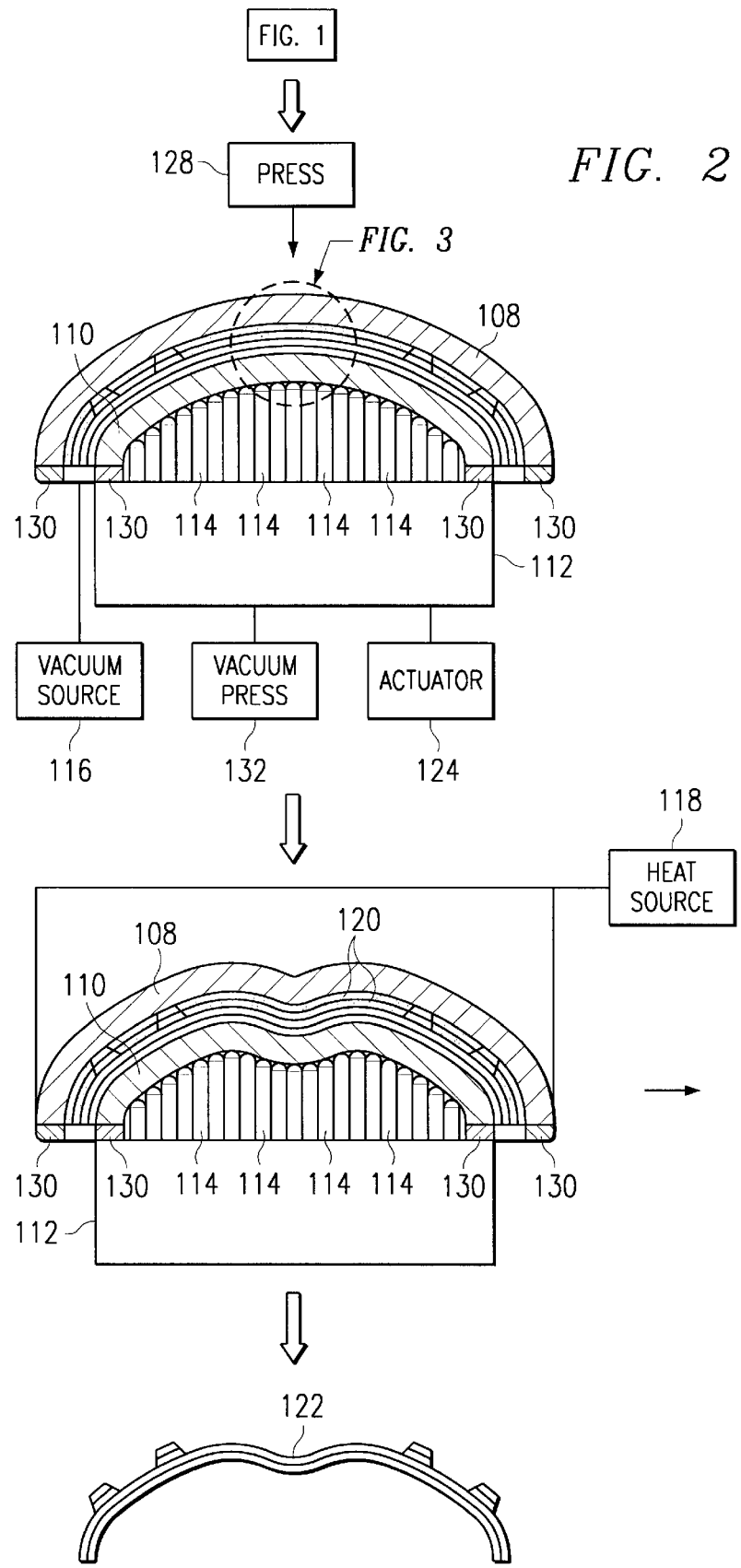

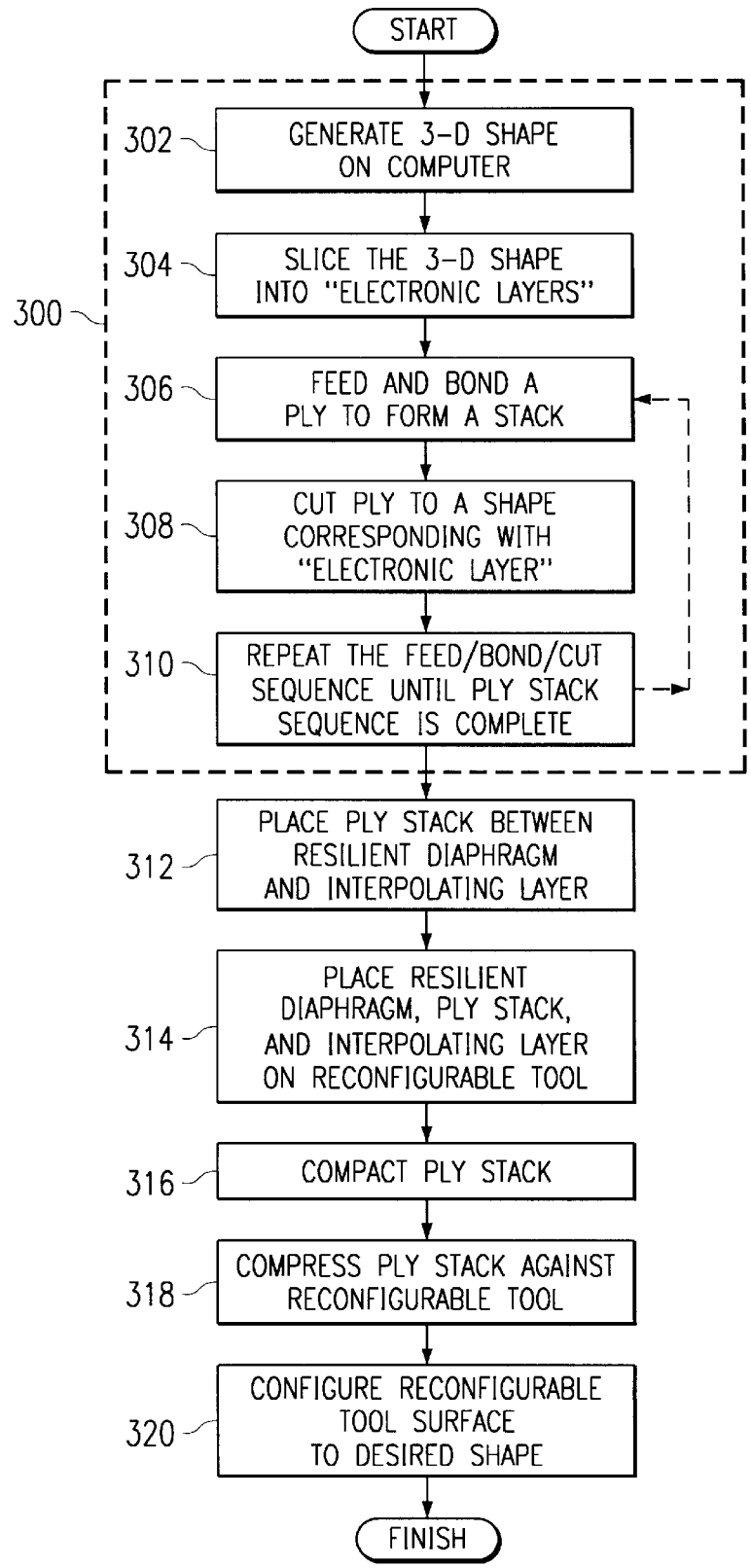

SYSTEM FOR CONSTRUCTING A LAMINATE

TECHNICAL FIELD OF THE INVENTION

This invention relates generally to the field of materials construction and, more specifically, to a system and method for constructing a laminate.

BACKGROUND OF THE INVENTION

Laminated Object Manufacturing (LOM) is a commercial rapid prototyping process that is used to fabricate industrial design prototypes directly from computer-aided design (CAD) files. In the LOM process, a CAD file is first generated of a solid model of the part to be fabricated. The CAD model is next "sliced" into a series of thin sequential layers. This CAD file is then sent to the LOM rapid prototyping unit to build a three-dimensional model of the part by a layered manufacturing approach.

The layered manufacturing approach is briefly described as follows. First, an automated sheet feeder mechanism transfers a single oversized ply of material (woven or tape) to a LOM build platform. A heated roller next bonds the ply to the build layer (the back of the ply typically contains a thermally activated adhesive). A laser then cuts the ply into the geometric shape that corresponds with the particular "slice" layer from the CAD file. Regions of the ply that do not correspond with the part volume are laser cross-hatched for subsequent removal. Successive ply transfer, lamination, laser cutting and cross-hatching steps are performed for each corresponding geometric "slice" layer from the CAD file until the entire object is constructed (which is now embedded in the cross-hatched volume of the ply stack). In a final decubing step, the laser cross-hatched regions of the lamination stack are manually removed to expose the three-dimensional model. The standard LOM process typically utilizes adhesive backed sheets of paper as a build material that produces three-dimensional models having properties close to that of wood.

The commercial LOM process described above (designated 2D LOM) has a major disadvantage for fabricating continuous fiber, curved composite structures in that the planar build technique does not allow the reinforcement to follow the direction of curvature of the component. This particular shortcoming of 2D LOM for composites fabrication has been overcome by the development of the curved LOM process (designated 3D LOM). In 3D LOM, a mandrel or tool is first generated by 2D LOM onto which the final part will be fabricated. The tool serves as the mold for producing the overall curved part geometry. The process is thus similar to conventional composites processing in that the laminate plies are sequentially draped over the surface of a tool and compacted with a flexible, elastomeric heated diaphragm. In recent years, special LOM tape formulations have been produced that allow fabrication of parts from a variety of metal, ceramic, polymer and composite materials. The advantages of LOM for fabricating composite components is based on its inherent capability for handling sheet materials, its high degree of automation, and the additional benefit that the process requires no tooling (other than the mandrel which it generates).

For parts fabricated with materials that require low lamination temperatures, standard LOM paper is often adequate as a build material for the mandrel/tool. However, for laminating tapes, plies, or prepregs that require higher lamination temperatures and/or compaction pressures, alternate materials for the mandrel/tool are required. The time, cost, and technical development required for fabricating such a mandrel/tool from these materials can equal that of the desired part. These tooling requirements of 3D LOM make the process less attractive as an effective rapid prototyping technique, especially for rapid composites prototyping. A rapid method for generating the required mandrel/tool shape is needed to make 3D LOM a more viable rapid prototyping process. In addition, a rapid method for generating composite parts with complex curvature is needed to enhance and extend the capabilities of 3D LOM.

Another rapid prototyping technique utilizes reconfigurable tooling (RT). A reconfigurable tool typically consists of an array of discrete, moveable metal pins whose cross-sectional geometry can vary depending on the particular forming application. The reconfigurable tool is interfaced with a computer software algorithm to allow the rapid repositioning of the discrete pins to generate a range of tooling surfaces. Usually an elastomeric interpolating layer is placed between the reconfigurable tool surface and the material to be formed to eliminate part dimpling caused by the die pins. This interpolating layer produces a smoother tool surface contour. Initially, RT was utilized for rapid prototyping for sheet metal parts. In recent years, however, RT has been developed that allows fabrication of parts from a variety of metal, ceramic, polymer and composite materials. The advantage of RT for fabricating composite components is based on its inherent capability for forming sheet materials and its high degree of automation. An RT concept is needed as a rapid method for generating composite parts with complex curvature to enhance and extend the capabilities of both composites forming and LOM-based prototyping technology.

While these systems and methods have provided a significant improvement over prior approaches, the challenges in the field of materials construction have continued to increase with demands for more and better techniques having greater flexibility and adaptability. Therefore, a need has arisen for a new and rapid system and method for constructing a laminate.

SUMMARY OF THE INVENTION

In accordance with the present invention, a system and method for constructing a laminate is provided that substantially eliminates or reduces disadvantages and problems associated with previously developed systems and methods.

A system for constructing a laminate is disclosed. The system comprises a ply feeder that sequentially stacks one or more plies to form a ply stack. A computer directs a laser to cut each ply to a desired shape after becoming part of the ply stack. The ply stack is then placed on a reconfigurable tool. An applied pressure compresses the ply stack against the reconfigurable tool while an actuator, or actuators, subsequently reconfigures the reconfigurable tool elements to a predetermined shape. In a more particular embodiment, a composites forming process is used, such as diaphragm forming, to compress the ply stack before the reconfigurable tool elements are reconfigured.

A method for constructing a laminate is disclosed. The method comprises four steps. Step one calls for utilizing a laminated object manufacturing process to lay-up a stack of plies to create a ply stack. Step two requires positioning the ply stack on a reconfigurable tool. Step three calls for compressing the ply stack against the reconfigurable tool, and the last step calls for configuring the reconfigurable tool to a desired shape. In a more particular embodiment, additional steps provide for placing the ply stack between two resilient diaphragms and compressing the ply stack before the step of configuring the reconfigurable tool to a desired shape.

A technical advantage of the present invention is the rapid generation of LOM mandrels/tools suitable for high temperature materials processing, such as 3D LOM of composites. The time and cost of developing and fabricating these high temperature tools traditionally can equal that of the actual structure being constructed.

Another technical advantage of the present invention is the ability to utilize LOM and RT to fabricate composite structures with complex curvature. The advantages of LOM for fabricating composite structures is based on its inherent capability for handling sheet materials, its high degree of automation, and the additional benefit that the process requires no permanent tooling. The advantage of RT for fabricating composite structures is based on its inherent capability for forming sheet materials and its high degree of automation.

An additional technical advantage of the present invention is extending the capabilities of composites forming, resulting in a greater range of complex designs and shapes with a LOM-based laser cutting and darting step before the final forming process. The automated laser cutting and darting step before final forming minimizes wrinkling and distortion of the material during forming.

BRIEF DESCRIPTION OF THE DRAWINGS

For a more complete understanding of the present invention, and for further features and advantages, reference is now made to the following description, taken in conjunction with the accompanying drawings, in which:

FIG. 2 is a schematic view illustrating one method of constructing a laminate in accordance with the present invention;

FIG. 4 is a flowchart demonstrating one method of constructing a laminate in accordance with the present invention.

DETAILED DESCRIPTION OF THE INVENTION

The preferred embodiments of the present invention and its advantages are best understood by referring now in more detail to FIGS. 1–4 of the drawings, in which like numerals refer to like parts.

Figure 1:
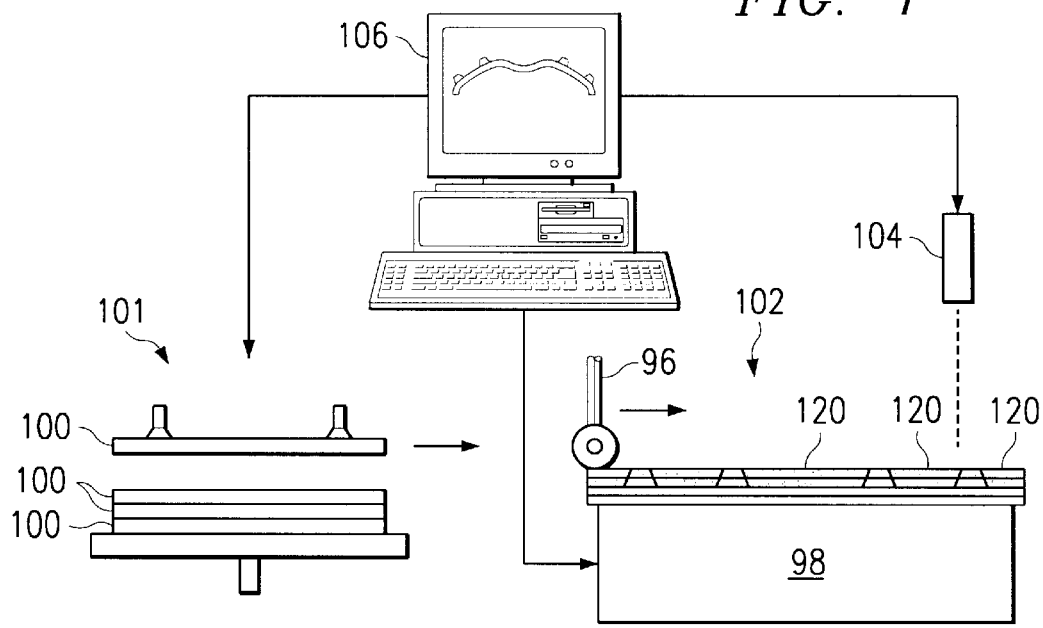
FIG. 1 is a schematic view illustrating one method of constructing a ply stack in accordance with the present invention.

FIG. 1 is a schematic view illustrating a laminated object manufacturing ("LOM") process in accordance with the present invention. LOM is a rapid prototyping process well known in the art of fabricating industrial design prototypes from computer-aided design ("CAD") files. In a typical LOM process, a ply feeder 101, which is normally automated, feeds plies 100 to a built platform 98. A roller 96 bonds plies 100 together to form a ply stack 102. Plies 100 are typically a tape material, similar to a thick sheet of paper, that contains a thermally activated adhesive. However, plies 100 may be other types of sheet materials such as metal, ceramic, polymer or composite. Roller 96 is typically a heated roller such that when the roller is exerting a pressure on ply 100 as it rolls along the length of ply 100, the heat activates the adhesive on the back of ply 100 thereby bonding ply 100 to the what is underneath ply 100. As each ply 100 is being fed to the built platform 98, a computer 106 directs a laser 104 to cut a desired shape into each ply 100. Certain sections 120 of ply 100 are cross-hatched for subsequent removal. This removal step is sometimes referred to as decubing. The decubing removes cross-hatched sections 120 to expose the three-dimensional prototype. To extend the range of complex shapes available using the present invention, a darting step may be employed during the LOM process. As plies 100 are being stacked, laser 104, in addition to cutting a desired shape and cross-hatching sections 120, will cut v-shaped notches or other shapes such as slots or slits in each ply 100. This darting step mitigates wrinkling of plies 100 as ply stack 102 is being formed to complex shapes. This process is similar to tailoring in that it allows plies 100 to fit better over a complex form. Once ply stack 102 is completed, it is transferred to a reconfigurable tool 112 as shown in FIG. 2.

Figure 3:
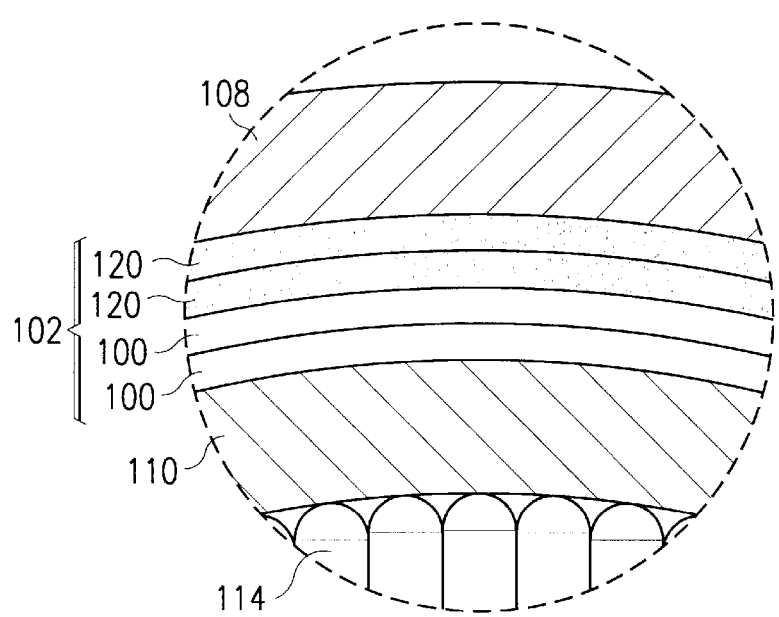
FIG. 3 illustrates, in greater detail, the reconfigurable tooling pins, interpolator, laminate, and resilient diaphragm useful in the practice of the present invention.

FIG. 2 is a schematic view illustrating one method of constructing a laminate in accordance with the present invention. The method shown is the combination of diaphragm forming and reconfigurable tooling. In diaphragm forming, which is well known in the art of composites forming, a resilient diaphragm 108 is placed on the top of ply stack 102, and an interpolating layer 110 is placed on the underside of ply stack 102 to form a sandwich-like structure. FIG. 3, which is discussed below, illustrates this sandwich-like structure in greater detail. Resilient diaphragm 108 and interpolating layer 110 are normally made from the same material, which is typically a polymer. However, it may also be made of other materials such as polyurethane, rubber, and neoprene. These flexible layers are well known in the art of composites forming. Both resilient diaphragm 108 and interpolating layer 110 are typically encased within a frame 130 which is generally made of metal. One purpose of frame 130 is to make it easier to handle these flexible materials. Frames 130 can be made of any type of material as long as it is rigid enough for handling purposes.

Referring to FIG. 2, the sandwich-like structure made up of resilient diaphragm 108, ply stack 102, and interpolating layer 110 is shown sitting on top of reconfigurable tool 112. Depending on the particular application, reconfigurable tool 112 can be configured in any initial configuration such as a flat position or a slightly curved position when ply stack 102 is placed on top of it. A vacuum source 116 is coupled to the volume between resilient diaphragm 108 and interpolating layer 110. A vacuum is pulled on this volume to compress ply stack 102 thereby facilitating efficient forming of ply stack 102. A vacuum press 132 is coupled to reconfigurable tool 112. A vacuum is pulled on reconfigurable tool 112 to create a suction effect whereby ply stack 102 is pressed against the surface of reconfigurable tool 112, the surface being defined by pins 114. A press 128, which may symbolize an alternate pressurizing medium such as air, oil, or another reconfigurable tool pin array, may apply an external mechanical force from above reconfigurable tool 112 in addition to the vacuum being pulled from below reconfigurable tool 112 to facilitate efficient forming of ply stack 102. However, either vacuum press 132, or press 128, may apply the only force to ply stack 102. In a specific embodiment, neither vacuum press 132, nor press 128, is used to force ply stack 102 into the surface of reconfigurable tool 112 if ply stack 102 can naturally deform against reconfigurable tool 112 through the action of external heat, its own weight, or a combination of both.

FIG. 2 also shows an actuator 124 coupled to reconfigurable tool 112. Actuator 124 is the mechanism used to determine the position of pins 114 of reconfigurable tool 112. Actuator 124 is typically a motorized gear mechanism, or may be comprised of individual mechanisms dedicated to each pin. These mechanisms are well known in the art of reconfigurable tooling. However, actuator 124 may comprise other types of mechanisms such as hydraulic or pneumatic mechanisms. The positioning of pins 114 of reconfigurable tool 112 may or may not be automated, but typically is automated. After the compression of ply stack 102 and the forcing of ply stack 102 into the surface of reconfigurable tool 112, actuator 124 is used to reconfigure pins 114 to a predetermined shape. This shape is what is desired for laminate 122 in its final form. The previous sequence can also be reversed (depending on the particular part geometry) in which the final tool shape is first reconfigured and then vacuum or pressure applied to ply stack 102 to further form the material against the surface of reconfigurable tool 112. A heat source 118 may be coupled to ply stack 102 for curing ply stack 102, depending on the type of material used for plies 100. Heat source 118 may be any conventional heat source well known in the art of curing composite materials, but is generally either radiant heat, blown air (convective) heat, or a heating blanket. After reconfiguring pins 114, and after any desired curing, laminate 122 is removed from between resilient diaphragm 108 and interpolating layer 110. The combination of LOM, reconfigurable tooling, and diaphragm forming, allows complex designs and shapes of laminates 122.

FIG. 3 illustrates, in greater detail, ply stack 102 sandwiched between resilient diaphragm 108 and interpolating layer 110. Ply stack 102 comprises plies 100 and cross-hatched sections 120. Pins 114 of reconfigurable tool 112 are also shown. Pins 114 are shown to have a head shape that is hemispherical. There are many other shapes that can be used for the heads of pins 114. As an example, pins 114 may have a cone-shaped head in the case where the pins are of a square shape or rectangular shape. Pins 114 may also be made of flat plates. Because of the discrete nature of pins 114, dimpling of laminate 122 may occur. This is generally why interpolating layer 110, as mentioned previously, is used. Interpolating layer 110 mitigates any dimpling effect of ply stack 102 during forming. However, interpolating layer 110 is not required, and may be eliminated from the diaphragm forming process. The same goes for resilient diaphragm 108; it may also be eliminated from the diaphragm forming process. It is also possible that neither interpolating layer 110 nor resilient diaphragm 108 is used. In this case, there is no diaphragm forming process, and either a different composites forming process is used, such as using a matched reconfigurable tool set, or ply stack 102 is dense enough to form under its own weight.

FIG. 4 is a flow chart demonstrating one method of constructing a laminate in accordance with the present invention. In one embodiment, a LOM process is utilized to create a ply stack 102 at step 300. The LOM process comprises the sub-steps of generating a three-dimensional shape on computer 106 at step 302, slicing the three-dimensional shape into electronic layers at step 304, feeding and bonding a ply 100 to form a stack at step 306, cutting the ply 100 to a shape corresponding to its electronic layer at step 308, and repeating the feed/bond/cut sequence at step 310 until ply stack 102 is formed. Ply stack 102 is then placed between resilient diaphragm 108 and interpolating layer 110 at step 312. The resilient diaphragm 108, ply stack 102, and interpolating layer 110 are then placed on reconfigurable tool 112 at step 314. Ply stack 102 is compacted at step 316 by pulling a vacuum on the volume between resilient diaphragm 108 and interpolating layer 110. The resilient diaphragm 108, ply stack 102, and interpolating layer 110 are then pressed against the surface of reconfigurable tool 112 at step 318. And the surface of reconfigurable tool 112 is configured to a desired shape at step 320. A decubing step may also be performed at any time after cross-hatched sections 120 are marked.

Although an embodiment of the invention and its advantages are described in detail, a person skilled in the art could make various alternations, additions, and omissions without departing from the spirit and scope of the present invention as defined by the appended claims.

What is claimed is:

1. A system for constructing a laminate, comprising:
   a plurality of plies formed from composite material;
   a ply feeder to sequentially stack the plurality of plies to form a ply stack;
   a laser to cut the plies;
   a computer to direct the laser to cut the plurality of plies to a desired shape;
   a reconfigurable tool operable to shape the ply stack;
   an actuator to reconfigure the reconfigurable tool;
   two resilient diaphragms, one resilient diaphragm placed on each side of the ply stack thereby forming a volume between the two resilient diaphragms that includes the ply stack; and
   a vacuum source for compacting the ply stack, the vacuum source coupled to the volume formed by the two resilient diaphragms.

2. The system of claim 1 further comprising a heat source for curing the ply stack, the heat source coupled to the volume formed by the two resilient diaphragms.

3. The system of claim 1 further comprising a press for engaging the ply stack and the reconfigurable tool.

4. The system of claim 3 wherein the press comprises a vacuum press coupled to the reconfigurable tool.

5. The system of claim 3 wherein the press comprises an external mechanical force exerted against the ply stack to press the ply stack against the reconfigurable tool.

* * * * *